June 24, 1941.  J. H. ALESSI ET AL  2,246,495
SAFETY PIN
Filed Nov. 12, 1938
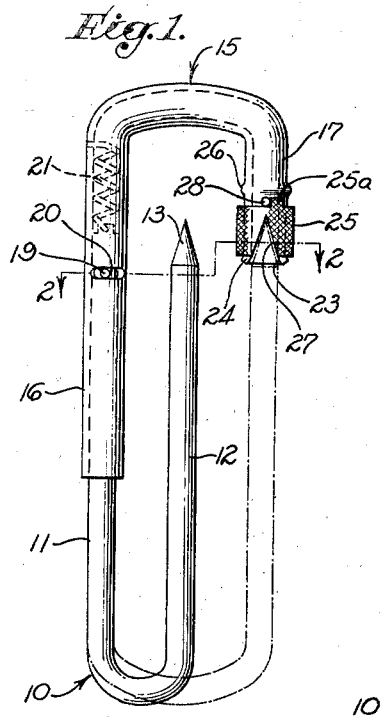
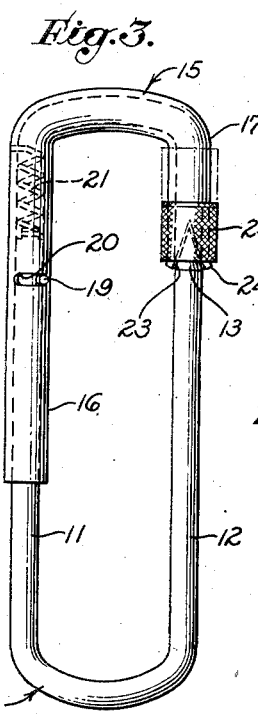
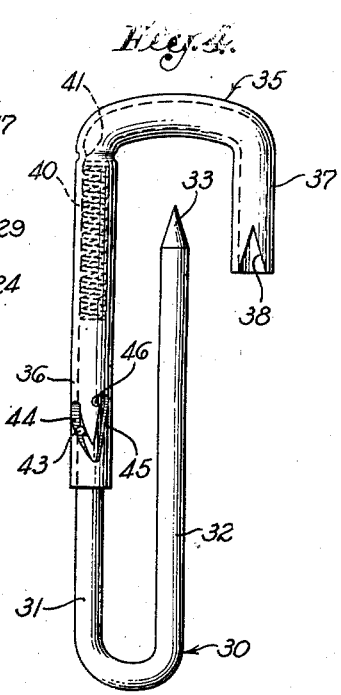
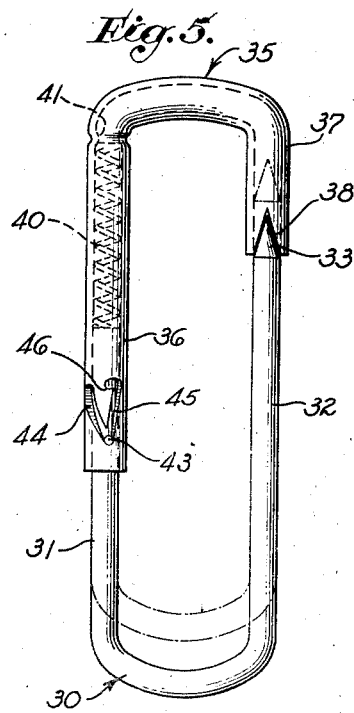
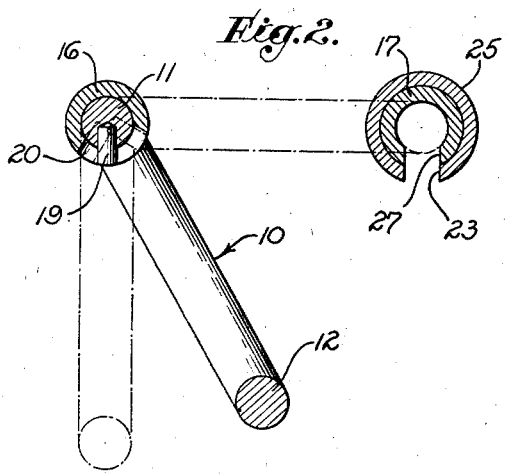
INVENTORS
JOSEPH H. ALESSI
STEWART C. LEE
BY
HARRIS, KIECH, FOSTER & HARRIS
FOR THE FIRM
ATTORNEYS Patented June 24, 1941

2,246,495

UNITED STATES PATENT OFFICE 2,246,495

SAFETY PIN

Joseph H. Alessi, La Crescenta, and Stewart C. Lee, Glendale, Calif., assignors, by direct and mesne assignments, of twenty-five per cent to said Lee, ten per cent to Leslie G. Cloud and ten per cent to Waiora R. Cloud, both of Glendale, Calif., five per cent to Leston L. Lovelace, Van Nuys, Calif., and fifty per cent to George L. Morris, Beverly Hills, and Kennedy Ellsworth, Los Angeles, Calif.

Application November 12, 1938, Serial No. 239,936

5 Claims. (Cl. 24—158)

Our invention relates to fastening devices for fabrics and the like, with particular reference to pins having safety guards.

A safety pin of the type in common use comprises a pin member having one leg with a pointed end for penetration and a second leg carrying an overhanging guard to receive or seat the pointed end, the two legs and the guard normally approximating a common plane. To provide a desirable tendency for the pointed end of the pin to remain seated in the guard, the pin member is usually designed as a spring to throw the pointed leg outwardly against the guard with substantial pressure.

One disadvantage of this conventional construction is that when the pin is in open disposition, the pointed end is necessarily beyond the range of the guard so that the spring action then tends to hold the pin open and to oppose movement of the pointed end toward engagement with the guard.

A second disadvantage of the common safety pin is that the guard does not engage the pointed end of the pin member in a positive manner. It is true that the guard is a stop against outward movement and against lateral movement in either direction, but only the inherent spring action of the pin member opposes the inward movement of the pointed end away from engagement with the guard. Unfortunately, designing the pin member for the desired spring action outwardly by using material with inherent spring and by forming a helix at the juncture of the two legs carries the penalty of weakening the resistance of the pin member against flexure laterally out of the normal plane. As a result, whenever the pointed end is flexed inwardly from the guard, it requires relatively little force to cause the pointed end to swerve past the guard into open position. It is characteristic of the conventional safety pin when employed for fastening a garment to be forced into open position accidentally with the pointed end exposed at a divergent angle to the hazard of the wearer.

With the above disadvantages in mind, we have as one object of our invention to provide a safety pin in which at the normal open position the spring action of the pin is toward rather than away from engagement with the guard. In other words, we propose to design the pin to have the normal open position of the pointed end occur in the course of normal movement of the pointed end toward the guard seat rather than have the open position result from springing the pointed end past the guard.

Another object of our invention in avoiding the above disadvantages is to provide a safety pin in which there is substantial inherent resistance to departure of the pointed end laterally from its normal path toward and away from the guard, it being contemplated that abnormal distortion by exceptional stress will be required to divert the pointed end of the pin out of range of the guard.

In achieving these two objects, we propose to employ a swivel connection between the pin member and the guard so that the pointed leg of the pin member will swing bodily in an arcuate path toward the guard rather than simply flex against the guard. A feature of this conception is that we may and preferably do employ a relatively rigid pin member to achieve substantial inherent resistance to flexure from that arcuate path. By using a spring in such an arrangement to urge the pin member rotatively toward the guard, we achieve a construction in which the pin at open disposition is invariably and continuously urged toward closed disposition. One of our more specific objects with respect to such a spring is to provide a novel arrangement for concealing the spring in the guard.

Although our pin is constructed with an inherent tendency to close immediately whenever it is opened accidentally, we propose as a further object of preferred forms of our invention to incorporate in the pin construction a positive latch for keeping the pin closed.

A more general object of our invention is to incorporate these various features in a construction that is efficient and rugged, but nevertheless relatively simply and inexpensive.

The above and other objects and advantages of our invention will be apparent in the course of the following detailed description considered with our accompanying drawing.

In the drawing:

Fig. 1 is a side elevation of one embodiment of our invention, the pin being shown in open position;

Fig. 2 is a transverse section taken as indicated by the broken line 2—2 of Fig. 1;

Fig. 3 is a side elevation of a second embodiment of our invention, the pin being closed and latched;

Fig. 4 is a side elevation of a third embodiment of our invention with the pin in open position; and Fig. 5 is a side elevation of the same pin in closed position.

Fig. 1 shows a U-shaped pin member, generally designated 10, having what may be termed a rearward leg 11 and a forward leg 12 with a pointed end 13 for penetration. Mounted on the pin member 10 is a guard, generally designated 15, having one tubular portion 16 rotatably telescoped over the rearward leg 11 and another tubular portion 17 to receive the pointed end of the pin member. Since the guard 15 consists essentially of these two interconnected tubular portions, we may construct the guard by simply bending a suitable tube to the U-shaped configuration shown in the drawing, but obviously other guard constructions may be employed under our concept.

The rearward leg 11 is secured against retraction from the tubular portion 16 of the guard by any suitable means. The drawing shows a projection or lug 19 extending radially from the rearward leg 11 into a transverse slot 20 in the tubular portion 16, the slot being of such disposition and circumferential extent as to permit the forward leg 12 to swing through a substantial angle toward and away from axial alignment with the tubular portion 17 of the guard. For the purpose of continuously urging the forward leg 12 into such axial alignment, we house within the tubular portion 16 of the guard a suitable torsional spring 21 having its lower end suitably connected to the rearward leg 11 and its upper end suitably attached to the inner wall of the guard. However, it will be understood that an equivalent type of spring may be substituted for the spring 21 without departing from the spirit of the invention.

In this first embodiment of our invention the tubular portion 17 of the guard extends into the arcuate path of movement of the pointed end 13 and is cut away to provide a triangular entrance 23 for the pointed end. By suitably dimensioning the tubular portion 17 of the guard and flaring out the annular edge 24 thereof to conform to the taper of the pointed end 13, we provide a seat that will stop the pointed end at approximately axial alignment with the tubular portion 17.

One of the many forms of latch applicable to our device consists, as shown in Fig. 1, of a latch sleeve 25 rotatably confined on the tubular portion 17 between the flared edge 24 and an annular shoulder 26 swaged in the tubular portion 17. The latch sleeve 25 is cut away to provide a triangular entrance 27 that may be rotated into registration with the triangular entrance 23 to receive the pointed end 13 and then rotated out of registration to latch the pointed end in the guard seat. Preferably the fit of the latch sleeve is not so loose as to favor accidental turning.

For the sake of convenience in manipulating the latch sleeve 25 to open or close the safety pin, we may form a projection 25a on the annular edge of the sleeve and provide a fixed stop lug 28 on the tubular portion 17 of the guard to cooperate therewith. Rotation in one direction brings the projection 25a against the limiting lug 28 when the triangular entrance 27 of the sleeve registers with the triangular entrance 23 of the guard to permit movement of the pointed end 13 into and out of the guard seat. The projection, of course, also limits the rotation of the latch sleeve in the opposite direction and is of sufficient extent that such opposite rotation will not carry the triangular entrance 27 again into registry with the triangular entrance 23. A feature of such a stop arrangement is that the latch sleeve may be rotated more than 180° away from registration of the two entrances.

The embodiment of our invention shown in Fig. 3 is identical in most respects to the construction shown in Fig. 1, corresponding numerals being employed to designate corresponding parts. The same pin member 10 is employed and the guard 15 differs solely in the omission of the annular shoulder 26. The distinguishing feature of this form of the device is that a latch sleeve 29 is employed that does not have a lateral entrance for the pointed end of the pin. The latch sleeve 29 is slidingly mounted on the tubular portion 17 of the guard to slide between an upper ineffective position indicated in dotted lines and a lower latching position shown in full lines in Fig. 3, at which lower position it covers the entrance 23 to the tubular portion 17.

In the embodiment of our invention shown in Fig. 4 we again employ a pin member, generally designated 30, having a rearward leg 31 and a forward leg 32 with a pointed end 33. The guard, generally designated 35, includes as before one tubular portion 36 to receive the rearward leg 31 and another tubular portion 37 with a triangular lateral entrance 38 for the pointed end 33.

In this form of our invention, preferably spring means urging the leg 31 in an axial direction cooperates with a cam means to rotate the pin member 30 relative to the guard 35 in a direction to close the pin. The direction in which the cam surface involved will be inclined will depend upon whether the spring-actuated axial movement is outwardly or inwardly. In the particular construction shown in the drawing, a spring 40 in the tubular portion 36 of the guard acts in compression between the end of the rearward leg 31 and an inwardly disposed annular shoulder 41 formed by a restriction of the tubular member 36. The required cam action for rotating the pin member 30 is provided by a projection or lug 43 extending radially from the rearward leg 31 into an inclined cam slot 44 in the tubular portion 36 of the guard. When the pointed end 33 of the pin member is seated in the tubular portion 37 of the guard, the lug 43 is at the lower end of the cam slot 44, as shown in full lines in Fig. 5.

Positive engagement of the pointed leg 32 of the pin by the tubular portion 37 of the guard is provided by arranging for axial movement of the pointed leg into the tubular portion 37 so that axial retraction is necessary to open the pin. To permit the desired axial movement of the pointed leg 32, an upwardly extending latching slot 45 is provided in the tubular portion 36 continuous with the lower end of the cam slot 44, and to releasably retain the pin member 30 in retracted position the latching slot 45 opens into a latching recess 46. The recess 46 extends slightly below its entrance from the latching slot 45 so that downward pressure by the spring 40 tends to keep the lug 43 seated in the recess. Preferably, the latching slot 45 is slightly inclined as indicated in the drawing with the result that, in retracting the pin member into latched position, it is necessary to continue rotation of the rear leg 31 to a slight extent against resistance engendered by flexure of the pointed leg 32. The feature of this arrangement is that when the safety pin is latched, the lug 43 is retained in the recess 46 not only by the force of the spring 40 but also by the resistance to flexure of the pin member 30. In fact, this resistance may be relied upon alone to hold the pin closed and the spring 40 may be omitted, the only sacrifice involved in such omission being the tendency of the pin to close automatically.

The specific forms of our invention selected for the purpose of this disclosure and specifically described herein to illustrate the principles involved will suggest to those skilled in the art various changes and modifications that do not depart from the essence of our concept. We specifically reserve the right to all such changes and modifications that properly come within the scope of our appended claims.

We claim as our invention:

1. A safety pin comprising: a pin member having a rearward leg and a forward leg with a pointed end; a hollow guard swiveled to said rearward leg of the pin member to rotate into and out of engagement with said pointed end; and a torsional spring housed in said guard to urge said guard and pin member into engaged position.

2. A safety pin comprising: a U-shaped pin member having a rearward leg and a forward leg with a pointed end; a guard having a first tubular portion providing a seat to receive said pointed end from a lateral direction and having a second tubular portion telescoped over said rearward leg for axial and rotative movement relative thereto, said second tubular portion having an inclined cam slot, a latching slot continuous therewith and a latching recess continuous with the latching slot; means extending radially from said rearward leg of the pin member into said cam slot whereby relative axial movement of said rearward leg and tubular portion will cause relative rotation to bring said pointed end into and out of said seat, and whereby movement of said radial means along said latching slot into said recess will move said pointed end axially into said first tubular portion and then latch said pin member against both longitudinal and rotative movement relative to the guard; and a spring acting between said pin member and guard to cause relative axial movement between said rearward leg and tubular portion in a direction to swing said pointed end to said seat.

3. A safety pin comprising: a U-shaped pin member having a rearward leg and a forward leg with a pointed end; a guard having a first tubular portion providing a seat to receive said pointed end from a lateral direction and having a second tubular portion telescoped over said rearward leg for axial and rotative movement relative thereto, said second tubular portion having a first rotation slot, a latching slot continuous therewith and a latching recess continuous with the latching slot; and means extending radially from said rearward leg of the pin member into said rotation slot whereby movement of said radial means along said latching slot into said recess will move said pointed end axially into said first tubular portion and then latch said pin member against both longitudinal and rotative movement relative to the guard, said latching slot being inclined to make it necessary to flex said pin member in latching or unlatching the pin.

4. A safety pin comprising: a pin member having a rearward leg and a forward leg with a pointed end; a guard member rotatively connected to said rearward leg of the pin member to permit the guard member to rotate relative thereto into and out of engagement with said pointed end; a torsion spring acting between said pin member and guard member to continuously urge said guard member rotatively into engagement with said pointed end of the pin member; and stop means including cooperative elements on said guard member and said pin member respectively to limit said relative rotation of the guard member out of engagement with said pointed end, thereby limiting the strain that may be placed on said spring.

5. A safety pin comprising: a U-shaped pin member having a rearward leg and a forward leg with a pointed end; a U-shaped guard member having a rearward leg rotatively connected to said rearward leg of the pin member to permit rotation relative thereto and having a forward leg providing a seat for said pointed end of the pin member; torsion means acting between said pin member and guard member to rotate said pointed end into said seat from any open position of the safety pin; means mounted on said forward leg of said guard member for movement relative thereto to latch said pin member in position with said pointed end in said seat; and means on one of said members cooperative with the other of said members to limit the rotation of the guard member relative to the pin member in the opening movement of the safety pin, thereby limiting the strain that may be placed on said torsion means.

JOSEPH H. ALESSI.
STEWART C. LEE.